Jan. 29, 1952 G. KLIEGEL 2,583,951

CUP, SAUCER AND CREAM JUG

Filed Oct. 11, 1946

Inventor
GEORGE KLIEGEL,
By
his Attorneys

Patented Jan. 29, 1952

2,583,951

UNITED STATES PATENT OFFICE 2,583,951

CUP, SAUCER, AND CREAM JUG

George Kliegel, Washington, D. C.

Application October 11, 1946, Serial No. 702,646

2 Claims. (Cl. 65—31)

It is an object of the present invention to provide for supporting a small cream jug on a saucer in a stable and satisfactory condition while a waiter is serving a cup of coffee, tea or other beverage, and also when cups, saucers and jugs are stacked in sets of assembled cups, saucers and jugs.

It is a further object of the invention to provide a simple and effective closure for the cream jug, which closure may be readily applied to the jug after the latter has been filled with cream, and also to provide for the convenient removal of the closure without requiring the use of a knife, fork or other instrument and without danger of spilling the contents of the jug.

With these and other objects in view, the present invention consists in the combination and arrangement of parts, as will be hereinafter more fully described, shown in the drawings and particularly pointed out in the appended claims, it of course being understood that changes in the form, proportion, size and minor details may be made, within the scope of the claims, without departing from the spirit or sacrificing any of the advantages of the invention.

In restaurants and the like it is a common practice, in serving a customer with a cup of coffee or other beverage, to place a small cream jug on the saucer. Due to the shape of the parts now in common use, the jug is supported in a very unstable manner and frequently becomes displaced and falls from the saucer. The present invention provides for conveniently assembling the jug with a saucer having a cup thereon and to maintain the jug in a stable condition such as will prevent the falling of the jug from the saucer even though the cup and saucer be handled somewhat negligently.

Figure 1:
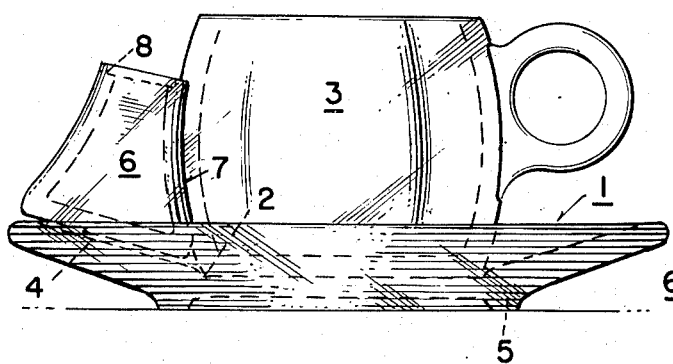
Figure 1 is a side elevation of a saucer, cup and cream jug of the present invention in assembled condition.
Figure 2:
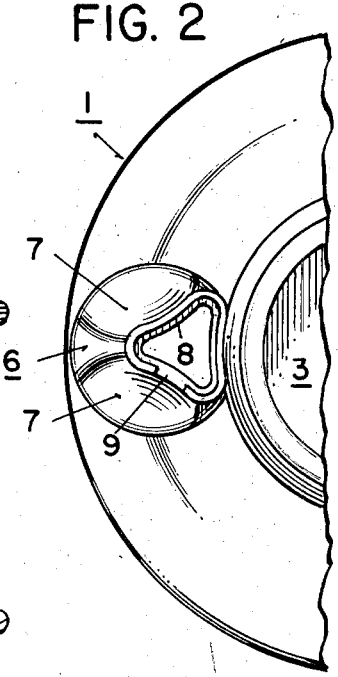
Figure 2 is a fragmentary plan view of Figure 1.
Figure 3:
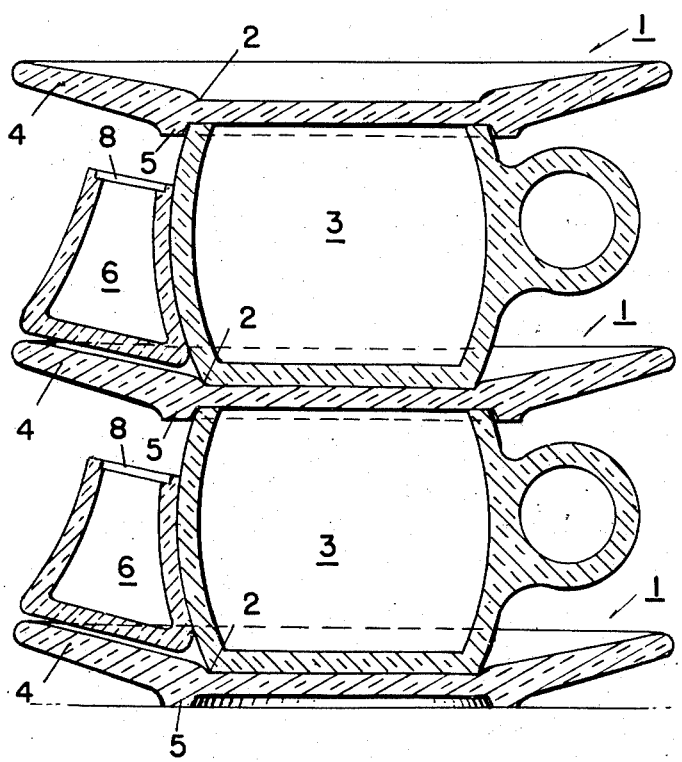
Figure 3 is a vertical sectional view of a plurality of pairs of cups, saucers and jugs assembled in stacked condition.
Figure 4:
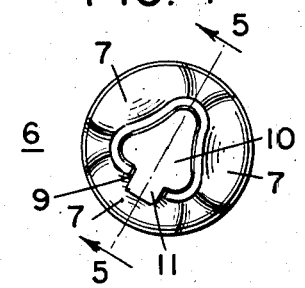
Figure 4 is a plan view of a jug of the present invention.
Figure 5:
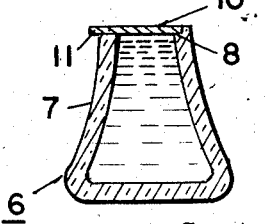
Figure 5 is a vertical sectional view of a jug of the present invention taken on the line 5—5 of Figure 4.

In carrying out the invention, the saucer 1 like any common or ordinary saucer has a central seat or depression 2 for the reception of the bottom of the cup 3. The upper surface of the saucer of the present invention, from the seat or depression 2 outwardly to the outer periphery of the saucer, as at 4, inclined upwardly and outwardly as best shown in Figure 3 so that its general configuration is that of the frustrum of a cone. The bottom of the saucer is provided with a circular rib 5 concentrically disposed and providing a base for the support of the saucer. The circular rib 5 defines a seat or socket of a diameter such that it will snugly receive the top edge of the cup when the saucer is placed thereon as shown in Figure 3, whereby a plurality of saucers, cups and cream jugs may be stacked in units, each unit including a saucer, a cup and a cream jug. When thus stacked, the cups may be empty or may contain a beverage, and the jugs may be empty or they may contain cream.

The jug member 6 of the present invention has a comparatively flat bottom face to rest upon the upper surface 4 of the saucer and is tapered inwardly from the base of the jug upwardly so that when the jug is placed upon the top surface 4 of the saucer with the inclined face of the jug lying against the adjacent face of the cup, the center of gravity of the jug is at the cup side of the jug, which puts the jug in a stable position or condition such that liability of being displaced is slight, and the cup and saucer may be handled, in serving the same to a customer, with small possibility of the jug being displaced and upset.

The jug shown in the accompanying drawing is of triangular shape in cross section so as to provide a plurality of longitudinal faces any one of which may be positioned against the side of the cup. These faces may be straight or may be slightly concave longitudinally and transversely so as to fit the side wall of the cup. A plurality of upwardly inclined external faces on the jug avoids the necessity of selecting a single face to be placed against the exterior wall of the cup.

For convenience in closing the open top of the jug, the latter is provided with an internal peripheral horizontal shoulder 8, and at least one top edge of the jug is provided with a notch or recess 9 extending entirely across the top edge of the jug. A closure member 10 of suitable material and of a shape and size to close the open top of the jug is placed downwardly upon the shoulder 8, and this closure is provided with a lateral projection 11 occupying the notch 9 and projecting slightly beyond the exterior of the jug and constituting a finger piece for use in removing the closure from the jug. The closure should fit within the open top of the jug with sufficient tightness to normally maintain the cover in place and at the same time permit of the cover being readily removed by manipulation of the finger piece 11.

A very important advantage of the present invention is well shown in Figure 3 of the drawing wherein it will be seen that the seat 2 in the top face of the saucer and the seat defined by the circular rib on the bottom of the saucer are so proportioned that a plurality of units made up of a cup and saucer may be assembled in a vertical stack with a cream jug on each saucer and disposed in a stable condition. When thus stacked, the cups and the jugs may be empty or filled with a liquid, and, in either condition, a waiter may conveniently remove from the top of the stack a unit consisting of a saucer, cup and cream jug without losing time to assemble the three members into a unit.

What I claim is:

1. In combination, a saucer having a flat central portion and an annular marginal portion extending outwardly and upwardly therefrom, a cup seated upon said central portion of the saucer, and a flat bottomed jug supported upon the upper face of the marginal portion of the saucer and provided with a plurality of side faces extending upwardly from its base, each of said faces having a surface contour conforming to the surface contour of the side wall of the cup, said jug resting against the cup with one of its contoured side faces in surface contact with the side wall thereof.

2. In combination, a saucer having a flat central portion and an annular marginal portion extending outwardly and upwardly therefrom, a cup seated upon said central portion of the saucer, and a flat bottomed jug supported upon the upper face of the marginal portion of the saucer and provided with a plurality of side faces extending upwardly and inwardly from its base, each of said faces having a surface contour conforming to the surface contour of the side wall of the cup, said jug resting against the cup with one of its contoured side faces in surface contact with the side wall thereof.

GEORGE KLIEGEL.

REFERENCES CITED

The following references are of record in the file of this patent:

UNITED STATES PATENTS

| Number | Name | Date |
| --- | --- | --- |
| D. 35,477 | Gnuchtel | Dec. 24, 1901 |
| D. 139,569 | O'Brien | Nov. 28, 1944 |
| 919,468 | Royer | Apr. 27, 1909 |
| 1,187,899 | Gardam | June 20, 1916 |
| 1,359,056 | Gregory | Nov. 16, 1920 |
| 1,421,696 | Kucera | July 4, 1922 |
| 1,596,133 | Wellen | Aug. 17, 1926 |
| 1,665,289 | Weaver | Apr. 10, 1928 |
| 1,666,389 | Mander | Apr. 17, 1928 |
| 1,688,992 | Smith | Oct. 23, 1928 |
| 1,832,806 | Dawson | Nov. 17, 1931 |
| 1,948,932 | McMickle | Feb. 27, 1934 |
| 2,012,113 | Thompson | Aug. 20, 1935 |
| 2,041,563 | Meinecke | May 19, 1936 |
| 2,047,582 | Hale | July 14, 1936 |
| 2,121,118 | Cooper | June 21, 1938 |
| 2,121,654 | Donchian | June 21, 1938 |
| 2,281,720 | Shefts | May 5, 1942 |
| 2,314,835 | Johns et al. | Mar. 23, 1943 |
| 2,348,028 | Rasch | May 2, 1944 |

FOREIGN PATENTS

| Number | Country | Date |
| --- | --- | --- |
| 389,646 | France | July 4, 1908 |